US010476796B2

(12) United States Patent
Gao et al.

(10) Patent No.: US 10,476,796 B2
(45) Date of Patent: Nov. 12, 2019

(54) PACKET PROCESSING METHOD, AND DEVICE AND SYSTEM

(71) Applicant: Huawei Technologies Co., Ltd., Shenzhen (CN)

(72) Inventors: Yuan Gao, Nanjing (CN); Tao Han, Nanjing (CN); Weilian Jiang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 15/795,587

(22) Filed: Oct. 27, 2017

(65) Prior Publication Data
US 2018/0069792 A1 Mar. 8, 2018

Related U.S. Application Data

(63) Continuation of application No. PCT/CN2015/097541, filed on Dec. 16, 2015.

(30) Foreign Application Priority Data
Apr. 30, 2015 (CN) .......................... 2015 1 0219028

(51) Int. Cl.
H04L 12/741 (2013.01)
H04L 12/46 (2006.01)
(Continued)

(52) U.S. Cl.
CPC ........ *H04L 45/745* (2013.01); *H04L 12/4633* (2013.01); *H04L 12/4641* (2013.01); *H04L 45/04* (2013.01); *H04L 49/70* (2013.01)

(58) Field of Classification Search
CPC ... H04L 45/745; H04L 12/46; H04L 12/4633; H04L 12/4641; H04L 12/4675; H04L 45/04; H04L 49/70; H04L 2012/4629
See application file for complete search history.

(56) References Cited

U.S. PATENT DOCUMENTS 8,861,345 B2 * 10/2014 Hares .................. H04L 29/06
370/229
10,171,559 B2 * 1/2019 Cai ..................... H04L 67/10
(Continued)

FOREIGN PATENT DOCUMENTS

CN 102055647 A 5/2011
CN 103580980 2/2014
(Continued)

OTHER PUBLICATIONS

Foreign Communication From A Counterpart Application, European Application No. 15890646.1, Extended European Search Report dated Jan. 31, 2018, 10 pages.
(Continued)

Primary Examiner — Jason E Mattis
Assistant Examiner — Bailor C. Hsu
(74) Attorney, Agent, or Firm — Conley Rose, P.C.

(57) ABSTRACT

A packet processing method, and a device and a system includes receiving, by a provider edge (PE) device, a first virtual extensible local area network (VxLAN) encapsulated packet sent by a network virtualization edge (NVE) device, where the PE device and the NVE device are located in a same data center (DC), and the first VxLAN encapsulated packet includes a first VxLAN network identifier (VNI); parsing, by the PE device, the first VxLAN encapsulated packet to obtain the first VNI; obtaining, according to a correspondence between a VNI and a virtual routing and forwarding (VRF) table, a first VRF table that corresponds to the first VNI; searching, by the PE device, the first VRF table for a route according to a destination Internet Protocol (IP) address of the first VxLAN encapsulated packet; and forwarding the first VxLAN encapsulated packet.

6 Claims, 4 Drawing Sheets

(51) Int. Cl.
*H04L 12/715* (2013.01)
*H04L 12/931* (2013.01)

(56) References Cited

U.S. PATENT DOCUMENTS

| | | | |
|---|---|---|---|
| 10,263,808 B2* | 4/2019 | Fu | H04L 12/4633 |
| 2007/0058638 A1 | 3/2007 | Guichard et al. | |
| 2011/0032843 A1 | 2/2011 | Papp et al. | |
| 2014/0006585 A1* | 1/2014 | Dunbar | H04L 41/00 709/223 |
| 2014/0086253 A1* | 3/2014 | Yong | H04L 12/4633 370/395.53 |
| 2014/0280846 A1* | 9/2014 | Gourlay | H04L 41/00 709/223 |
| 2015/0003463 A1* | 1/2015 | Li | H04L 12/4641 370/395.53 |
| 2015/0188769 A1 | 7/2015 | Gu | |
| 2015/0281062 A1* | 10/2015 | Duda | H04L 45/74 709/238 |
| 2016/0050125 A1* | 2/2016 | Mattson | H04L 41/5051 709/225 |
| 2016/0142220 A1 | 5/2016 | Hao et al. | |
| 2016/0285760 A1* | 9/2016 | Dong | H04L 12/4666 |
| 2017/0118043 A1 | 4/2017 | Hao et al. | |
| 2017/0317919 A1* | 11/2017 | Fernando | H04L 61/103 |

FOREIGN PATENT DOCUMENTS

| | | |
|---|---|---|
| CN | 103607349 A | 2/2014 |
| CN | 104518940 A | 4/2015 |
| WO | 2014205784 A1 | 12/2014 |

OTHER PUBLICATIONS

Machine Translation and Abstract of Chinese Publication No. CN102055647, dated May 11, 2011, 23 pages.
Machine Translation and Abstract of Chinese Publication No. CN103607349, dated Feb. 26, 2014, 24 pages.
Rekhter, Y., Ed., et al., "A Border Gateway Protocol 4 (BGP-4)," RFC 4271, Jan. 2006, 104 pages.
Bates, T., et al., "Multiprotocol Extensions for BGP-4," RFC 4760, Jan. 2007, 12 pages.
Mahalingam, M., et al., "Virtual eXtensible Local Area Network (VXLAN): A Framework for Overlaying Virtualized Layer 2 Networks over Layer 3 Networks," RFC 7348, Aug. 2014, 22 pages.
Sajassi, A., Ed., et al., "BGP MPLS-Based Ethernet VPN," RFC 7432, Feb. 2015, 56 pages.
Foreign Communication From A Counterpart Application, PCT Application No. PCT/CN2015/097541, English Translation of International Search Report dated Mar. 23, 2016, 3 pages.

\* cited by examiner

PACKET PROCESSING METHOD, AND DEVICE AND SYSTEM

CROSS-REFERENCE TO RELATED APPLICATIONS

This application is a continuation application of International Patent Application No. PCT/CN2015/097541, filed on Dec. 16, 2015, which claims priority to Chinese Patent Application No. 201510219028.9, filed on Apr. 30, 2015. The disclosures of the aforementioned applications are hereby incorporated by reference in their entireties.

TECHNICAL FIELD

The present application relates to the network communications technologies, and in particular, to a packet processing method, and a device and a system.

BACKGROUND

Virtual Extensible Local Area Network (VxLAN) is a technology in which a layer 2 packet is encapsulated by using a layer 3 protocol. According to a main technical principle of VxLAN, an encapsulated packet in a media access control in user datagram protocol (MAC-in-UDP) format is introduced, that is, an Ethernet frame is encapsulated in a User Datagram Protocol (UDP) packet for transmission, to transmit the Ethernet frame on a layer 3 network. In this way, a layer 2 network is extensible within a layer 3 range. In a service scenario in which a data center (DC) intercommunicates with a virtual network of a site, the DC provides virtual machine (VM) services for multiple enterprises, and a host of the site communicates with a VM in the DC through a VxLAN tunnel. In implementation, a DC-side provider edge (PE) device needs to create a corresponding sub-interface for each tenant, and each sub-interface is bound to a corresponding virtual private network (VPN) routing and forwarding (VRF) table, thereby implementing interconnection between a DC-side network and a provider network.

However, in an actual application, a sub-interface on the DC-side PE device needs to be allocated to each VRF, and then the allocated sub-interface is bound to a corresponding VRF. Therefore, there is the following problem. Because a new sub-interface needs to be allocated on the DC-side PE device when a new tenant is added, relatively many interface resources on the DC-side PE device are occupied, and a corresponding configuration process is complex.

SUMMARY

In view of this, embodiments of the present application provide a packet processing method, and a device and a system, so that a configuration of a DC-side PE device is simplified in a service scenario in which a DC and a site intercommunicate on a virtual network.

Technical solutions provided in the embodiments of the present application are as follows.

According to a first aspect, a packet processing method is provided, including receiving, by a PE device, a first VxLAN encapsulated packet sent by a network virtualization edge (NVE) device, where the PE device and the NVE device are located in a same data center DC, and the first VxLAN encapsulated packet includes a first VxLAN network identifier (VNI); parsing, by the PE device, the first VxLAN encapsulated packet to obtain the first VNI, and obtaining, according to a correspondence between a VNI and a VRF table, a first VRF table that corresponds to the first VNI; and searching, by the PE device, the first VRF table for a route according to a destination Internet Protocol (IP) address of the first VxLAN encapsulated packet, and forwarding the first VxLAN encapsulated packet.

In a first possible implementation manner of the first aspect, the method further includes deploying, by the PE device, the Border Gateway Protocol (BGP), and receiving, by the PE device, a BGP route update message sent by the NVE device, where the BGP route update message includes a VxLAN tunnel end point (VTEP) address and a VNI that corresponds to the VTEP address.

In a second possible implementation manner of the first aspect, the method further includes learning, by the PE device, the VTEP address in the BGP route update message to a VRF table according to a correspondence between the VNI and the VRF table.

In a third possible implementation manner of the first aspect, the method further includes advertising, by the PE device, the VTEP address to a remote PE device by using the BGP.

With reference to the first aspect, or any possible implementation manner of the first aspect, in a fourth possible implementation manner of the first aspect, the method further includes performing, by the PE device, multiprotocol label switching (MPLS) encapsulation on the first VxLAN encapsulated packet before forwarding the first VxLAN encapsulated packet.

According to a second aspect, a packet processing method is provided, including establishing, by an NVE device, a BGP connection to a PE device, where the PE device and the NVE device are located in a same data center DC; storing, by the NVE device, a correspondence between a VTEP address and a VNI; and sending, by the NVE device, a BGP route update message to the PE device by using the BGP connection, where the BGP route update message includes a VTEP address and a VNI that corresponds to the VTEP address.

According to a third aspect, a PE device is provided, including a receiving unit configured to receive a first VxLAN encapsulated packet sent by an NVE device, where the PE device and the NVE device are located in a same data center DC, and the first VxLAN encapsulated packet includes a first VNI; a processing unit configured to parse the first VxLAN encapsulated packet to obtain the first VNI, and obtain, according to a correspondence between a VNI and a VRF table, a first VRF table that corresponds to the first VNI; and a forwarding unit configured to search the first VRF table for a route according to a destination IP address of the first VxLAN encapsulated packet, and forward the first VxLAN encapsulated packet.

In a first possible implementation manner of the third aspect, the PE device deploys the BGP, and the PE device further includes a route update message receiving unit configured to receive a BGP route update message sent by the NVE device, where the BGP route update message includes a VTEP address and a VNI that corresponds to the VTEP address.

In a second possible implementation manner of the third aspect, the PE device further includes a learning unit configured to learn the VTEP address in the BGP route update message to a VRF table according to a correspondence between the VNI and the VRF table.

In a third possible implementation manner of the third aspect, the PE device further includes an advertising unit configured to advertise the VTEP address to a remote PE device by using the BGP.

With reference to the third aspect, or any possible implementation manner of the third aspect, in a fourth possible implementation manner of the third aspect, the PE device further includes an MPLS encapsulation unit configured to perform MPLS encapsulation on the first VxLAN encapsulated packet before the first VxLAN encapsulated packet is forwarded.

According to a fourth aspect, an NVE device is provided, including a BGP connection unit configured to establish a BGP connection between the NVE device and a PE device, where the PE device and the NVE device are located in a same data center DC; a corresponding unit configured to store a correspondence between a VTEP address and a VNI; and a route update message sending unit configured to send a BGP route update message to the PE device by using the BGP connection, where the BGP route update message includes a VTEP address and a VNI that corresponds to the VTEP address.

According to a fifth aspect, a DC system is provided, including the PE device according to the third aspect or any possible implementation manner of the third aspect and the NVE device according to the fourth aspect or any possible implementation manner of the fourth aspect.

In the technical solutions in the implementation manners of the present application, after receiving a first VxLAN encapsulated packet sent by a DC-side NVE device, a DC-side PE device parses the first VxLAN encapsulated packet to obtain a first VNI, obtains, according to a correspondence between a VNI and a VRF table, a first VRF table that corresponds to the first VNI, to search the first VRF table for a route according to a destination IP address of the first VxLAN encapsulated packet, and forwards the first VxLAN encapsulated packet. The PE device and the NVE device are located in a same DC. Correspondingly, the NVE device establishes a BGP connection to the PE device, where the PE device and the NVE device are located in a same DC, stores a correspondence between a VTEP address and a VNI, and sends a BGP route update message by using the BGP connection, where the BGP route update message includes a VTEP address carrying VNI information. The implementation manners of the present application further provide a PE device, an NVE device, and a DC system, so as to resolve a problem that many interface resources are occupied and a corresponding configuration process is complex because a sub-interface is created when a new tenant is added, thereby simplifying a configuration of a DC-side PE device. In addition, the configuration process is further simplified by automatically updating and learning a VTEP address to a corresponding VRF table by means of BGP protocol extension.

BRIEF DESCRIPTION OF DRAWINGS

To describe the technical solutions in the embodiments of the present application more clearly, the following briefly introduces the accompanying drawings required for describing the embodiments. The accompanying drawings in the following description show some embodiments of the present application, and a person of ordinary skill in the art may still derive other drawings from these accompanying drawings without creative efforts.

DESCRIPTION OF EMBODIMENTS

Embodiments of the present application provide a packet processing method, and a device and a system, so that a configuration of a DC-side PE device is simplified in a service scenario in which a DC on a virtual network intercommunicates with a site. In addition, the configuration process may be further simplified by automatically updating and learning a VTEP address to a corresponding VRF table by means of BGP protocol extension.

The following describes the technical solutions of the present application in an example by using specific embodiments.

To make the application objectives, features, and advantages of the present application clearer and more comprehensible, the following clearly describes the technical solutions in the embodiments of the present application with reference to the accompanying drawings in the embodiments of the present application. The embodiments described in the following are merely some rather than all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth", and so on are intended to distinguish between different objects but do not indicate a particular order. In addition, the terms "include" and "contain" mean to cover the non-exclusive inclusion, for example, a process, method, system, product, or device that includes a list of steps or units is not necessarily limited to the list of steps and units, but may further include steps and units not listed.

Figure 1:
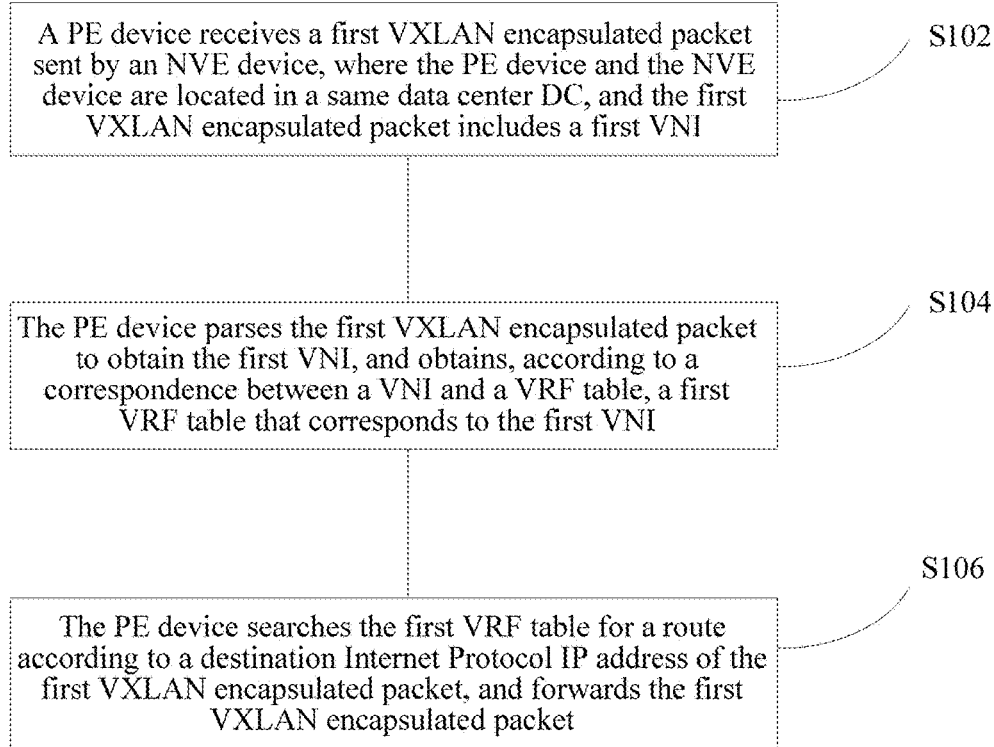
FIG. 1 is a flowchart of a packet processing method according to a first embodiment of the present application.

FIG. 1 is a flowchart of a packet processing method according to a first embodiment of the present application. As shown in FIG. 1, the method may include the following steps.

Step S102. A PE device receives a first VxLAN encapsulated packet sent by an NVE device, where the PE device and the NVE device are located in a same DC, and the first VxLAN encapsulated packet includes a first VNI.

For example, the DC may include the PE device, the NVE device, and a VM device. After encapsulating a service packet, the DC-side VM sends the encapsulated service packet to the DC-side NVE device. After receiving the service packet sent by the DC-side VM, the DC-side NVE device searches for an IP address of an NVE device to which a host belongs, and performs VxLAN tunnel encapsulation on the service packet. A tunnel destination end point VTEP is a VxLAN gateway to which a remote host belongs. The VxLAN gateway may be a remote NVE device. The DC-side PE device receives the first VxLAN encapsulated packet sent by the DC-side NVE device, where the first VxLAN encapsulated packet includes a first VNI. The first VNI may have a length of 24 bits, and may support a VxLAN segment-based network isolation that is up to 16 M. For example, a virtual network segment may support users that are up to 16 M, so that isolation and identification of users are no longer restricted, satisfying a great quantity of users.

Step S104. The PE device parses the first VxLAN encapsulated packet to obtain the first VNI, and obtains, according to a correspondence between a VNI and a VRF table, a first VRF table that corresponds to the first VNI.

For example, after receiving the first VxLAN encapsulated packet, the DC-side PE device parses the first VxLAN encapsulated packet. The parsing may be considered as a specific manner of operating the packet, for example, a "reading" manner, to obtain the first VNI in the first VxLAN encapsulated packet. A correspondence between a VNI and a VRF table is stored on the DC-side PE device. For example, the correspondence between a VNI and a VRF table may be stored in the following implementation manner. Each VPN instance may correspond to a VRF table, first, a correspondence between a VNI and a VPN instance may be determined, then a corresponding VRF table is found by using the VPN instance, and identification information of the VNI is added to the VRF table, to form a correspondence between the VNI and the VRF table. One VNI may correspond to one VRF table, or multiple VNIs correspond to one VRF table. This constitutes no limitation. When multiple VNIs correspond to one VRF table, multiple pieces of VNI identification information may be added to a same VRF table. When the first VNI has been obtained, the first VRF table that corresponds to the first VNI may be found by searching for the VNI identification information in the VRF table.

For example, the correspondence between a VNI and a VRF table is determined in the following manner. Optionally, for example, each VNI and a corresponding VRF table may be matched when deploying the DC or changing a device in the DC. Each VNI may be sent by the DC-side NVE device to the DC-side PE device, to match each VNI with a corresponding VRF table. In addition, the DC-side NVE device may periodically send a VNI, to update information.

Step S106. The PE device searches the first VRF table for a route according to a destination IP address of the first VxLAN encapsulated packet, and forwards the first VxLAN encapsulated packet.

For example, after obtaining the first VRF table according to the first VNI, the DC-side PE device searches the first VRF table for a corresponding route according to the destination IP address of the first VxLAN encapsulated packet that includes the first VNI, and forwards the first VxLAN encapsulated packet to a remote PE device through a VxLAN tunnel. The remote PE device may be a site-side PE device. Optionally, the remote PE device may be a provider device.

In the packet processing method provided in this embodiment, the DC-side PE device parses the first VxLAN encapsulated packet to obtain the first VNI, obtains, according to the correspondence between a VNI and a VRF table, the first VRF table that corresponds to the first VNI, and forwards the first VxLAN encapsulated packet on the basis of the first VRF table. In this way, no new sub-interface needs to be allocated on the DC-side PE device when a new tenant is added. Therefore, less interface resources are occupied and a configuration is simplified.

Optionally, the PE device deploys the BGP, and the PE device receives a BGP route update message sent by the NVE device, where the BGP route update message includes a VTEP address and a VNI that corresponds to the VTEP address.

For example, when updating is performed on the DC side and the site side, for example, an enterprise host of the site is changed, routing information on the DC-side PE device needs to be updated. In this case, the DC-side PE device may deploy BGP, and the DC-side PE device receives a BGP route update message sent by the DC-side NVE device, where the BGP route update message includes a VTEP address. A correspondence between the VTEP address and a VNI is stored on the DC-side NVE device. The VTEP address received by the DC-side PE device may include corresponding VNI information.

Optionally, the PE device learns the VTEP address in the BGP route update message to a VRF table according to the correspondence between a VNI and a VRF table.

For example, the correspondence between a VNI and a VRF table is stored on the DC-side PE device. After receiving the VTEP address carrying the corresponding VNI information, the DC-side PE device learns the VTEP address in the BGP route update message to a VRF table according to an association of the VNI, to update routing information. In addition, an updating period is not limited in the present application. For example, updating may be performed in real time or periodically.

Optionally, the PE device advertises the VTEP address to a remote PE device by using the BGP.

For example, to ensure that routing information is the same on the DC side and the site side, the DC-side PE device advertises the VTEP address to a remote PE device by using the BGP. The remote PE device may include a site-side PE device.

Optionally, the PE device performs MPLS encapsulation on the first VxLAN encapsulated packet before forwarding the first VxLAN encapsulated packet.

For example, the DC-side PE device may perform MPLS encapsulation before forwarding the first VxLAN encapsulated packet. A format of the packet on which MPLS encapsulation has been performed is outer Ethernet (ETH) header+traffic engineering-based (TE) tunnel MPLS label+VPN MPLS label+outer VxLAN IP header (NVE destination and source IP addresses)+UDP header+VxLAN header+inner ETH header+inner IP address.

In a conventional implementation manner that does not use the solution in this embodiment of the present application, the DC-side PE device needs to create a corresponding sub-interface for each site-side tenant, and bind the sub-interface to a corresponding VRF. In this way, the VxLAN encapsulated packet is sent to the remote PE device by means of creating a sub-interface. However, in development of networks in recent years, network integration constantly increases, and users increase greatly. If the foregoing conventional implementation manner is used, many interface resources on the DC-side PE device are occupied, and much configuration work is needed, resulting in a complex configuration. The conventional manner of configuring sub-interfaces cannot meet the foregoing flexible application requirements.

In the technical solution provided in this embodiment of the present application, a first VxLAN encapsulated packet is parsed to obtain a first VNI; a first VRF table corresponding to the first VNI is obtained according to a correspondence between a VNI and a VRF table, and the first VxLAN encapsulated packet is forwarded on the basis of the first VRF table. In this way, no new sub-interface needs to be allocated on a PE device when a new tenant is added. Therefore, less interface resources are occupied and a configuration is simplified, so that current network evolution requirements can be better met.

In the foregoing embodiment, specific method steps performed by a DC-side PE device in the packet processing method according to the present application is described. The following describes specific method steps performed by a DC-side NVE device in a packet processing method in detail according to the present application.

Figure 2:
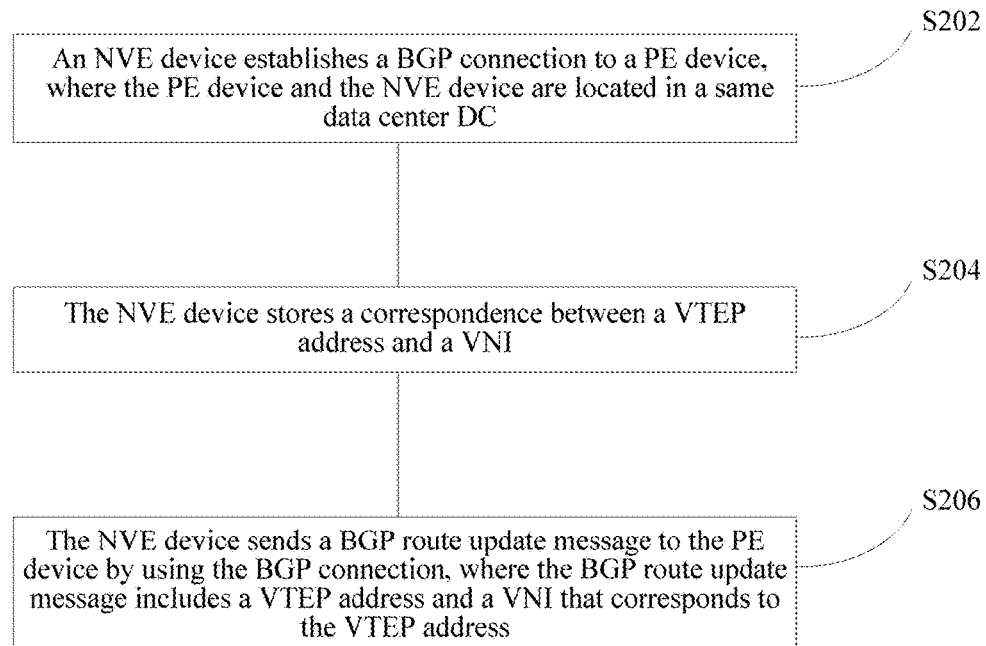
FIG. 2 is a flowchart of a packet processing method according to a second embodiment of the present application.

FIG. 2 is a flowchart of a packet processing method according to a second embodiment of the present application. As shown in FIG. 2, the method may include the following steps.

Step S202. An NVE device establishes a BGP connection to a PE device, where the PE device and the NVE device are located in a same DC.

For example, the DC-side NVE device not only sends a VxLAN encapsulated packet to the DC-side PE device, but also updates routing information by means of BGP extension, to ensure in-time routing information updating of the DC-side PE device, for example, tenant adding or service changing. Therefore, the DC-side NVE device may establish a BGP connection to the DC-side PE device.

Step S204. The NVE device stores a correspondence between a VTEP address and a VNI.

For example, the DC-side NVE device performs VxLAN tunnel encapsulation on a service packet by using a VTEP address. The DC-side NVE device may store the correspondence between the VTEP address and the VNI, thereby forming the correspondence between the VTEP address and the VNI.

Step S206. The NVE device sends a BGP route update message to the PE device by using the BGP connection, where the BGP route update message includes a VTEP address and a VNI that corresponds to the VTEP address.

For example, the DC-side NVE device sends the BGP route update message to the DC-side PE device by using the BGP connection. The BGP route update message includes a VTEP address, where the VTEP address may carry VNI information. Because a correspondence between a VNI and a VRF table is stored on the DC-side PE device, after receiving the VTEP address carrying the corresponding VNI information, the DC-side PE device may learn the VTEP address in the BGP route update message to a VRF table according to an association of the VNI, to update the routing information in the VRF table. In addition, an updating period of the routing information in the VRF table is not limited in this embodiment of the present application, and the routing information in the VRF table may be updated in real time or periodically.

For example, the DC-side NVE device receives a service packet sent by a DC-side VM and performs VxLAN encapsulation on the service packet, to obtain a VxLAN encapsulated packet, and the DC-side NVE device sends the VxLAN encapsulated packet to the DC-side PE device.

In the packet processing method provided in this embodiment, a DC-side NVE device advertises a VTEP address to a DC-side PE device by means of BGP extension, and learns advertised VTEP routing information to a corresponding VRF table, thereby ensuring in-time updating of routing information in the DC-side PE device and improving service deployment flexibility to meet a service requirement such as adding a new tenant.

In the foregoing embodiment, specific method steps performed by a DC-side NVE device in the packet processing method according to the present application is described. The following describes in detail a schematic diagram of an application scenario of a method according to an embodiment of the present application.

Figure 3:
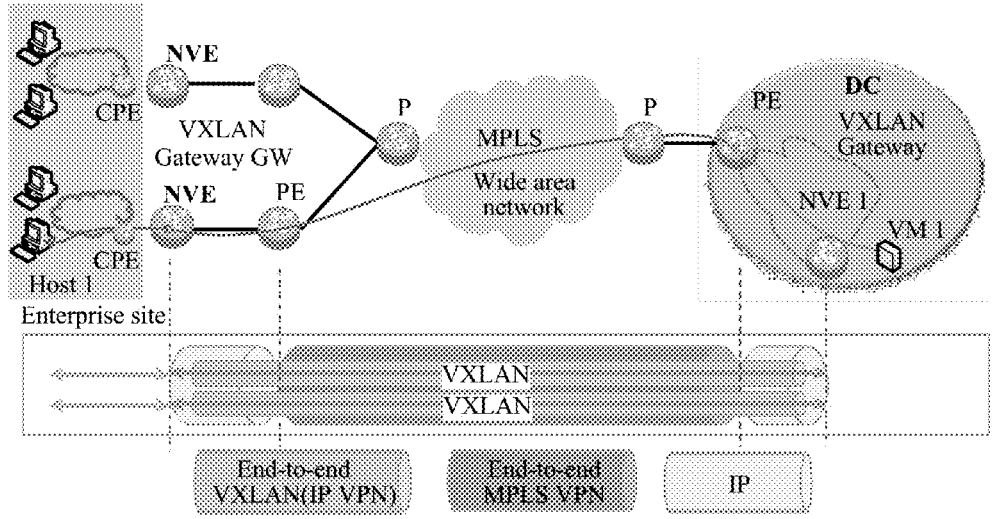
FIG. 3 is a schematic diagram of an application scenario of a method according to an embodiment of the present application.

FIG. 3 is a schematic diagram of an application scenario of a method according to an embodiment of the present application. As shown in FIG. 3, a packet reaches a host 1 from a DC-side VM 1 by passing through a DC-side NVE 1, a DC-side PE device, and an MPLS network. FIG. 3 describes a packet processing process between a DC and an enterprise site by using an example. A specific implementation process is as follows.

(1) The DC may provide VM services for multiple enterprises. The DC-side PE device has a corresponding VRF table of each enterprise. The DC-side VM 1 encapsulates a service packet, and sends the encapsulated service packet to the DC-side NVE 1.

(2) The DC-side NVE 1 receives the service packet sent by the DC-side VM 1, searches for an IP address of an NVE device to which the enterprise host 1 belongs, and performs VxLAN tunnel encapsulation on the service packet, to obtain a first VxLAN encapsulated packet. A tunnel destination end point VTEP is a VxLAN gateway to which an enterprise host belongs. The VxLAN gateway may be a remote NVE device. The DC-side NVE 1 device sends, through an established VxLAN tunnel, the first VxLAN encapsulated packet to the VxLAN gateway to which the enterprise host belongs.

For example, the IP address of the NVE to which the enterprise host 1 belongs may be searched for, for example, by using the following method. The DC-side NVE 1 stores a mapping relationship between an MAC address of the enterprise host 1 and the IP address of the NVE to which the enterprise host 1 belongs, and the IP address of the NVE to which the enterprise host 1 belongs can be found by using the mapping relationship.

(3) The DC-side PE device receives the first VxLAN encapsulated packet sent by the DC-side NVE 1 device, parses the first VxLAN encapsulated packet to obtain a first VNI, and obtains, according to a correspondence between a VNI and a VRF table, a first VRF table that corresponds to the first VNI. The DC-side PE device searches the first VRF table for a route according to a destination IP address of the first VxLAN encapsulated packet, and forwards the first VxLAN encapsulated packet.

Optionally, the DC-side PE device may perform MPLS encapsulation on the first VxLAN encapsulated packet. A format of the packet on which MPLS encapsulation has been performed is outer ETH header+TE tunnel MPLS label+VPN MPLS label+outer VxLAN IP header (NVE destination and source IP addresses)+UDP header+VxLAN header+inner ETH header+inner IP address.

(4) After receiving the packet on which MPLS encapsulation has been performed, a site-side PE device performs MPLS decapsulation on the packet, searches a corresponding VRF table for a path, and sends the first VxLAN encapsulated packet to a site-side NVE device.

(5) After receiving the first VxLAN encapsulated packet, the site-side NVE device performs VxLAN encapsulation, and sends the service packet to the corresponding host 1.

In addition, the DC-side NVE 1 may implement routing information updating by means of BGP extension. A specific process is as follows.

(1) The DC-side NVE 1 device establishes a BGP connection to the DC-side PE device.

(2) The DC-side NVE 1 device stores a correspondence between a VTEP address and a VNI.

(3) The DC-side NVE 1 device sends a BGP route update message by using the BGP connection, where the BGP route update message includes a VTEP address and a VNI that corresponds to the VTEP address.

The DC-side NVE 1 device sends the BGP route update message by using the BGP connection, where the BGP route update message includes the VTEP address, and the VTEP address may carry VNI information. Because a correspondence between a VNI and a VRF table is stored on the DC-side PE device, after receiving the VTEP address carrying the corresponding VNI information, the DC-side PE device learns the VTEP address in the BGP route update message to a VRF table according to an association of the VNI, to update the routing information. In addition, an updating period is not limited in the present application. For example, updating may be performed in real time or periodically.

In this embodiment, an application scenario corresponding to a packet processing method between a DC and an enterprise site is described in detail. For an implementation manner of each step, refer to corresponding descriptions in the first embodiment and the second embodiment. The foregoing implementation process resolves a problem that many interface resources are occupied and a corresponding configuration process is complex because a sub-interface is created when a new tenant is added, thereby simplifying a configuration of a DC-side PE device. In addition, the configuration process is further simplified by automatically updating and learning a VTEP address to a corresponding VRF table by means of BGP protocol extension.

The foregoing embodiment describes a schematic diagram of an application scenario of a method according to an embodiment of the present application. The following describes in detail a schematic structural diagram of a PE device and that of hardware of a PE device according to embodiments of the present application.

Figure 4:
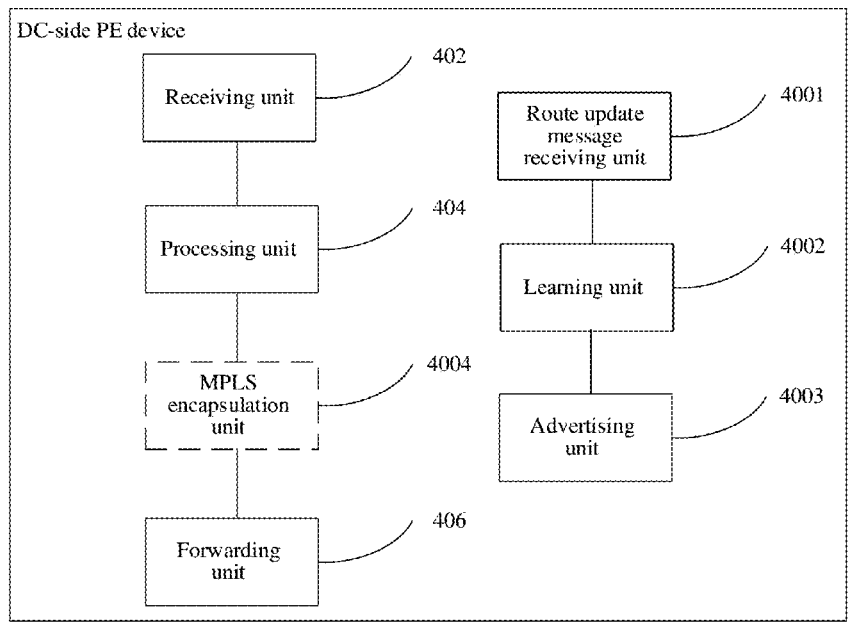
FIG. 4 is a schematic structural diagram of a PE device according to an embodiment of the present application.

FIG. 4 is a schematic structural diagram of a PE device according to an embodiment of the present application. As shown in FIG. 4, the PE device includes a receiving unit 402, a processing unit 404, and a forwarding unit 406.

The receiving unit 402 is configured to receive a first VxLAN encapsulated packet sent by an NVE device, where the PE device and the NVE device are located in a same DC, and the first VxLAN encapsulated packet includes a first VNI.

The processing unit 404 is configured to parse the first VxLAN encapsulated packet to obtain the first VNI, and obtain, according to a correspondence between a VNI and a VRF table, a first VRF table that corresponds to the first VNI.

The forwarding unit 406 is configured to search the first VRF table for a route according to a destination IP address of the first VxLAN encapsulated packet, and forward the first VxLAN encapsulated packet.

Optionally, the PE device deploys the BGP, and the PE device further includes a route update message receiving unit 4001 configured to deploy the BGP, and receive a BGP route update message sent by the NVE device, where the BGP route update message includes a VxLAN tunnel end point VTEP address and a VNI that corresponds to the VTEP address.

Optionally, the PE device further includes a learning unit 4002 configured to learn the VTEP address in the BGP route update message to a VRF table according to a correspondence between the VNI and the VRF table.

Optionally, the PE device further includes an advertising unit 4003 configured to advertise the VTEP address to a remote PE device by using the BGP.

Optionally, the PE device further includes an MPLS encapsulation unit 4004 configured to perform MPLS encapsulation on the first VxLAN encapsulated packet before the first VxLAN encapsulated packet is forwarded.

The PE device shown in FIG. 4 may implement corresponding steps of the methods in the foregoing embodiment. A DC-side PE device parses a first VxLAN encapsulated packet to obtain a first VNI, obtains, according to a correspondence between a VNI and a VRF table, a first VRF table that corresponds to the first VNI, and forwards the VxLAN encapsulated packet on the basis of the first VRF table. Therefore, less interface resources are occupied and a configuration is simplified.

Figure 5:
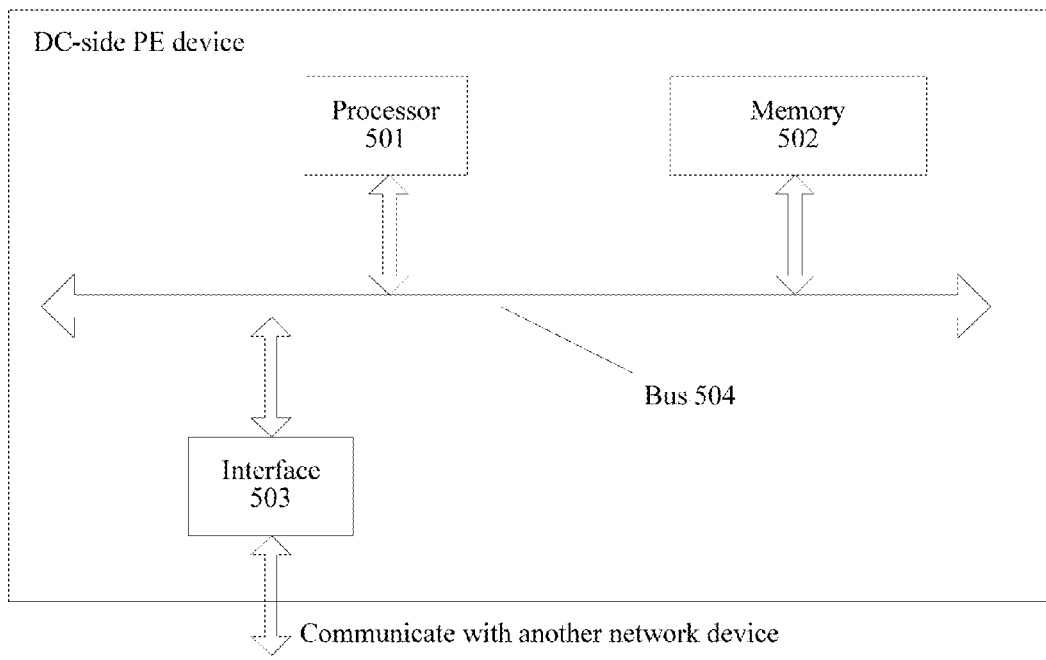
FIG. 5 is a schematic structural diagram of hardware of a PE device according to an embodiment of the present application.

FIG. 5 is a structural diagram of hardware of a PE device according to an embodiment of the present application. The PE device shown in FIG. 5 may perform corresponding steps performed by a DC-side PE device in the method according to the foregoing embodiment. As shown in FIG. 5, the PE device includes a processor 501, a memory 502, an interface 503, and a bus 504. The interface 503 may be implemented in a wireless or a wired manner, and may be an element such as a network interface card (NIC). The processor 501, the memory 502, and the interface 503 are connected by using the bus 504.

The memory 502 is configured to store program code. Optionally, the program code may include an operating system program and an application program.

The interface 503 is configured to receive a first VxLAN encapsulated packet sent by an NVE device, where the PE device and the NVE device are located in a same DC, and the first VxLAN encapsulated packet includes a first VNI.

The processor 501 is configured to parse the first VxLAN encapsulated packet to obtain the first VNI, and obtain, according to a correspondence between a VNI and a VRF table, a first VRF table that corresponds to the first VNI.

The interface 503 is further configured to search the first VRF table for a route according to a destination IP address of the first VxLAN encapsulated packet, and forward the first VxLAN encapsulated packet.

Optionally, the PE device deploys BGP, and the interface 503 is further configured to receive a BGP route update message sent by the NVE device, where the BGP route update message includes a VxLAN tunnel end point VTEP address and a VNI that corresponds to the VTEP address.

Optionally, the processor 501 is further configured to learn the VTEP address in the BGP route update message to a VRF table according to the correspondence between the VNI and the VRF table.

Optionally, the interface 503 is further configured to advertise the VTEP address to a remote PE device by using the BGP.

Optionally, the processor 501 is further configured to perform MPLS encapsulation on the first VxLAN encapsulated packet before forwarding the first VxLAN encapsulated packet.

The PE device shown in FIG. 5 may be configured to perform corresponding steps performed by a DC-side PE device in the method according to the foregoing embodiment. A DC-side PE device parses a first VxLAN encapsulated packet to obtain a first VNI, obtains, according to a correspondence between a VNI and a VRF table, a first VRF table that corresponds to the first VNI, and forwards the first VxLAN encapsulated packet on the basis of the first VRF table. Therefore, less interface resources are occupied and a configuration is simplified.

The foregoing embodiments describe a schematic structural diagram of a DC-side PE device and that of hardware of a DC-side PE device according to embodiments of the present application. The following describes in detail a schematic structural diagram of a DC-side NVE device and that of hardware of a DC-side NVE device according to embodiments of the present application.

Figure 6:
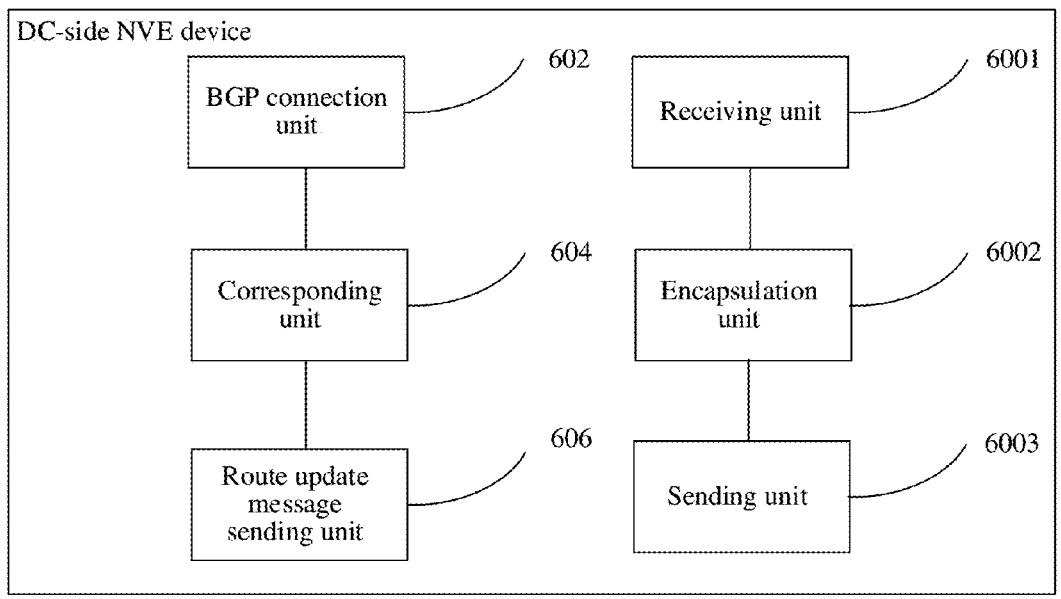
FIG. 6 is a schematic structural diagram of an NVE device according to an embodiment of the present application.

FIG. 6 is a schematic structural diagram of an NVE device according to an embodiment of the present application. The NVE device shown in FIG. 6 may perform corresponding steps performed by a DC-side NVE device in the method in the foregoing embodiment. As shown in FIG. 6, the NVE device includes a BGP connection unit 602, a corresponding unit 604, and a route update message sending unit 606.

The BGP connection unit 602 is configured to establish a BGP connection between the DC-side NVE device and a DC-side PE device, where the PE device and the NVE device are located in a same DC.

The corresponding unit 604 is configured to store a correspondence between a VTEP address and a VNI.

The route update message sending unit 606 is configured to send a BGP route update message to the PE device by using the BGP connection, where the BGP route update message includes a VTEP address and a VNI that corresponds to the VTEP address.

Optionally, the NVE device further includes a receiving unit 6001, an encapsulation unit 6002, and a sending unit 6003. The receiving unit 6001 is configured to receive a service packet sent by a DC-side VM. The encapsulation unit 6002 is configured to perform VxLAN encapsulation on the service packet, to obtain a VxLAN encapsulated packet. The sending unit 6003 is configured to send the VxLAN encapsulated packet to the DC-side PE device.

The NVE device shown in FIG. 6 may be configured to perform corresponding steps performed by a DC-side NVE device in the method according to the foregoing embodiment. By means of BGP extension, a DC-side NVE device advertises a VTEP address to a DC-side PE device and learns to a corresponding VRF table, thereby ensuring that routing information is updated in time, and a configuration is simplified to meet a service requirement such as adding a new tenant.

Figure 7:
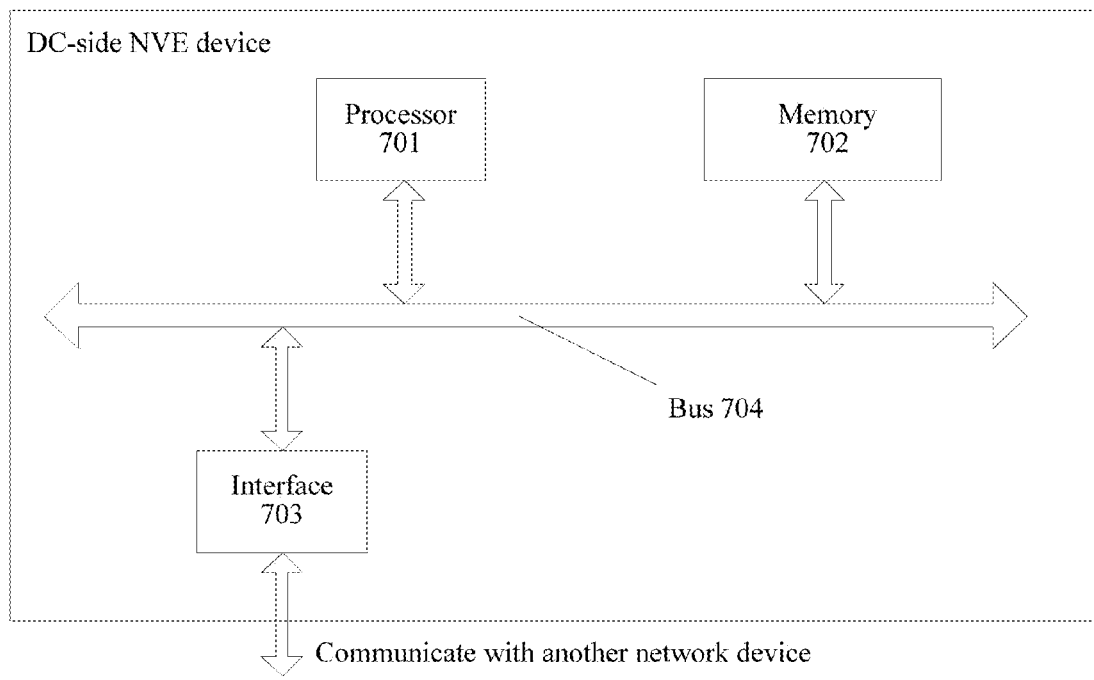
FIG. 7 is a schematic structural diagram of hardware of an NVE device according to an embodiment of the present application.

FIG. 7 is a structural diagram of hardware of an NVE device according to an embodiment of the present application. The NVE device shown in FIG. 7 may perform corresponding steps performed by a DC-side NVE device in the method in the foregoing embodiment. As shown in FIG. 7, the NVE device includes a processor 701, a memory 702, an interface 703, and a bus 704. The interface 703 may be implemented in a wireless or a wired manner, and may be an element such as a network interface card. The foregoing processor 701, memory 702, and interface 703 are connected by using the bus 704.

The memory 702 is configured to store program code. Optionally, the program code may include an operating system program and an application program.

The interface 703 is configured to establish a BGP connection between the NVE device and a PE device, where the PE device and the NVE device are located in a same DC.

The processor 701 is configured to store a correspondence between a VTEP address and a VNI.

The interface 703 is configured to send a BGP route update message to the PE device by using the BGP connection, where the BGP route update message includes a VTEP address and a VNI that corresponds to the VTEP address.

The NVE device shown in FIG. 7 may be configured to perform corresponding steps performed by a DC-side NVE device in the method according to the foregoing embodiment. By means of BGP extension, a DC-side NVE device advertises a VTEP address to a DC-side PE device and learns to a corresponding VRF table, thereby ensuring that routing information is updated in time, and a configuration is simplified to meet a service requirement such as adding a new tenant.

The foregoing embodiments describe a schematic structural diagram of an NVE device and that of hardware of an NVE device according to embodiments of the present application. The following describes in detail a structure of a data center according to an embodiment of the present application.

Figure 8:
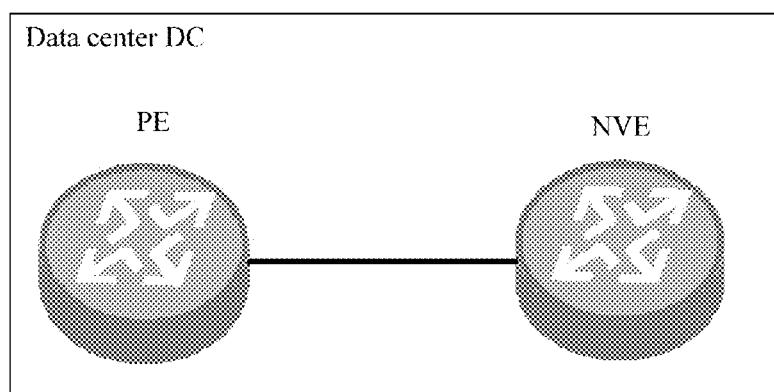
FIG. 8 is a schematic structural diagram of a data center according to an embodiment of the present application.

FIG. 8 shows a data center DC according to an embodiment of the present application. As shown in FIG. 8, the data center DC includes a PE device and an NVE device. The data center DC may perform the methods in the first embodiment and the second embodiment. The PE device and the NVE device may have structures described in FIG. 4 to FIG. 7 and content of specification that corresponds to FIG. 4 to FIG. 7. Implementation principles and technical effects of the data center are similar, and are not described in detail again herein.

The data center, the PE device, and the NVE device in this embodiment of the present application may all perform the methods and steps in the foregoing embodiments.

For example, the receiving unit 402 of the PE device is configured to receive a VxLAN encapsulated packet sent by the sending unit 6003 of the NVE device, where the PE device and the NVE device are located in a same DC, and the first VxLAN encapsulated packet includes a first VNI. The processing unit 404 of the PE device is configured to parse the first VxLAN encapsulated packet to obtain the first VNI, and obtain, according to a correspondence between a VNI and a VRF table, a first VRF table that corresponds to the first VNI. The forwarding unit 406 of the PE device is configured to search the first VRF table for a route according to a destination IP address of the first VxLAN encapsulated packet, and forward the first VxLAN encapsulated packet.

For example, the BGP connection unit 602 of the NVE device is configured to establish a BGP connection between the NVE device and the PE device, where the PE device and the NVE device are located in a same DC. The corresponding unit 604 of the NVE device is configured to store a correspondence between a VTEP address and a VNI. The route update message sending unit 606 of the NVE device is configured to send a BGP route update message to the route update message receiving unit 4001 of the PE device by using the BGP connection, where the BGP route update message includes a VTEP address and a VNI that corresponds to the VTEP address.

A person of ordinary skill in the art may understand that, each aspect of the present application or a possible implementation manner of each aspect may be implemented as a system, a method, or a computer program product. Therefore, each aspect of the present application or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present application or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM) or flash memory, an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a local computer of a user, or some may be executed on a local computer of a user as a standalone software package, or some may be executed on a local computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person skilled in the art can make various modifications and variations to the present application without departing from the spirit and scope of the present application. The present application is intended to cover these modifications and variations of the present application provided that they fall within the scope of protection of the present application defined by the following claims and their equivalent technologies.

What is claimed is:

1. A packet processing method, comprising:
   receiving, by a provider edge (PE) device, a first Virtual Extensible Local Area Network (VxLAN) encapsulated packet from a network virtualization edge (NVE) device, wherein the PE device and the NVE device are located in a same data center (DC), and wherein the first VxLAN encapsulated packet comprises a first VxLAN network identifier (VNI);
   parsing, by the PE device, the first VxLAN encapsulated packet to obtain the first VNI;
   obtaining, according to a correspondence between a VNI and a virtual private network (VPN) routing and forwarding (VRF) table, a first VRF table that corresponds to the first VNI, wherein obtaining the first VRF table comprises searching a VRF table in the DC;
   searching, by the PE device, the first VRF table for a route according to a destination Internet Protocol (IP) address of the first VxLAN encapsulated packet;
   after the PE device obtains the first VRF table that corresponds to the first VNI, forwarding the first VxLAN encapsulated packet to a remote PE device;
   deploying, by the PE device, a Border Gateway Protocol (BGP);
   receiving, by the PE device, a BGP route update message from the NVE device, wherein the BGP route update message comprises a VxLAN tunnel end point (VTEP) address and a VNI that corresponds to the VTEP address; and
   adding, by the PE device, the VTEP address in the BGP route update message to a second VRF table according to a correspondence between the second VRF table and the VNI that corresponds to the VTEP address.

2. The packet processing method of claim 1, further comprising advertising, by the PE device, the VTEP address to a remote PE device using the BGP.

3. The packet processing method of claim 1, further comprising performing, by the PE device, multiprotocol label switching (MPLS) encapsulation on the first VxLAN encapsulated packet before forwarding the first VxLAN encapsulated packet.

4. A provider edge (PE) device, comprising:
   a memory storing instructions; and
   a processor coupled to the memory and configured to execute the instructions, wherein the instructions cause the processor to be configured to:
   receive a first Virtual Extensible Local Area Network (VxLAN) encapsulated packet from a network virtualization edge (NVE) device, wherein the PE device and the NVE device are located in a same data center (DC), and wherein the first VxLAN encapsulated packet comprises a first VxLAN network identifier VNI;
   parse the first VxLAN encapsulated packet to obtain the first VNI;
   obtain, according to a correspondence between a VNI and a virtual private network (VPN) routing and forwarding (VRF) table, a first VRF table that corresponds to the first VNI, wherein obtaining the first VRF table comprises searching a VRF table in the DC;
   search the first VRF table for a route according to a destination Internet Protocol (IP) address of the first VxLAN encapsulated packet;
   after the PE device obtains the first VRF table that corresponds to the first VNI, forward the first VxLAN encapsulated packet to a remote PE device;
   deploy a Border Gateway Protocol (BGP);
   receive a BGP route update message from the NVE device, wherein the BGP route update message comprises a VxLAN tunnel end point VTEP address and a VNI that corresponds to the VTEP address; and
   add the VTEP address in the BGP route update message to a second VRF table according to a correspondence between the second VRF table and the VNI that corresponds to the VTEP address.

5. The PE device of claim 4, wherein the instructions further cause the processor to be configured to advertise the VTEP address to a remote PE device using the BGP.

6. The PE device of claim 4, wherein the instructions further cause the processor to be configured to perform multiprotocol label switching (MPLS) encapsulation on the first VxLAN encapsulated packet before the first VxLAN encapsulated packet is forwarded.

* * * * *